(12) United States Patent
Vodopyanov

(10) Patent No.: US 8,891,160 B2
(45) Date of Patent: Nov. 18, 2014

(54) BROADLY AND FAST TUNABLE OPTICAL PARAMETRIC OSCILLATOR

(76) Inventor: Konstantin Vodopyanov, San Jose, CA (US)

( * ) Notice: Subject to any disclaimer, the term of this patent is extended or adjusted under 35 U.S.C. 154(b) by 670 days.

(21) Appl. No.: 13/093,509

(22) Filed: Apr. 25, 2011

(65) Prior Publication Data

US 2011/0261438 A1    Oct. 27, 2011

Related U.S. Application Data

(60) Provisional application No. 61/343,210, filed on Apr. 26, 2010.

(51) Int. Cl.
    *G02F 1/39*    (2006.01)
(52) U.S. Cl.
    CPC ............ *G02F 1/39* (2013.01); *G02F 2201/307* (2013.01); *G02F 2203/15* (2013.01)
    USPC ....................................................... 359/330
(58) Field of Classification Search
    None
    See application file for complete search history.

(56) References Cited

U.S. PATENT DOCUMENTS

| | | | |
|---|---|---|---|
| 5,594,592 A * | 1/1997 | Harlamoff et al. ............ | 359/330 |
| 6,044,094 A | 3/2000 | Govorkov | |
| 6,501,591 B1 * | 12/2002 | Kumar et al. ................. | 359/330 |
| 2002/0176472 A1 * | 11/2002 | Arbore et al. .................. | 372/72 |
| 2004/0125434 A1 | 7/2004 | Kumar | |
| 2005/0243876 A1 * | 11/2005 | Kung .............................. | 372/21 |
| 2009/0219956 A1 * | 9/2009 | Laurell et al. .................. | 372/20 |
| 2010/0246610 A1 * | 9/2010 | Mirov et al. .................... | 372/10 |
| 2012/0236395 A1 * | 9/2012 | Shuman ........................ | 359/330 |

FOREIGN PATENT DOCUMENTS

GB        2315360 A    1/1998

OTHER PUBLICATIONS

Ganikhanov et al, "Narrow-linewidth middle-infrared ZnGeP2 optical parametric oscillator", Jun. 2001, Journal of Optical Society of America, vol. 18, No. 6, pp. 818-822.*

* cited by examiner

*Primary Examiner* — Hemang Sanghavi
(74) *Attorney, Agent, or Firm* — William Greener; Bond, Schoeneck & King, PLLC

(57) ABSTRACT

A coherent light source is provided for producing narrow-linewidth output, continuously tunable within a broad (at least one-octave-wide) range of optical wavelengths. The source is based on type-I or type-0 near-degenerate optical parametric oscillator (OPO), which uses a nonlinear optical crystal with either birefringent phase matching or quasi phase matching. The pump wavelength is chosen such that the OPO degeneracy wavelength (at twice the pump wavelength), is close to the point of zero group-velocity dispersion. That results in an extremely broad OPO bandwidth. Fast OPO wavelength tuning is achieved by rotating an intracavity diffraction grating. In accordance with the invention, the choice of a nonlinear crystal and a pump source determines the overall tuning range. For example, the use of lithium niobate provides tuning over the range of 1.3 to 3 microns, ZGP—3.8 to 8 microns, gallium arsenide—4 to 12 microns, CGA—6 to 13 microns.

32 Claims, 3 Drawing Sheets

BROADLY AND FAST TUNABLE OPTICAL PARAMETRIC OSCILLATOR

CROSS-REFERENCE TO RELATED APPLICATION

This patent application claims priority to U.S. Provisional Application No. 61/343,210 filed Apr. 26, 2010.

FIELD OF THE INVENTION

This invention relates to a system and method for producing broadly and fast tunable coherent optical radiation.

BACKGROUND OF THE INVENTION

The invention relates generally to optical parametric oscillators (OPOs) and more particularly to a continuously tunable OPOs operating in the near-infrared and mid-infrared range, in both continuous wave (CW) and pulsed modes.

Optical parametric oscillators have been recognized as useful to effect the efficient conversion of fixed wavelength laser radiation into broadly wavelength-tunable radiation. OPOs can provide an efficient source of high power coherent radiation at wavelengths, which are not covered by conventional lasers. They convert monochromatic laser radiation (pump) into a tunable output via three-wave mixing process with quantum conversion efficiencies of up to >90%. The heart of an OPO is a nonlinear-optical (NLO) crystal which is characterized by a NLO coefficient, $d_{eff}$. In the NLO crystal, the pump photon decays into two less energetic photons (signal and idler) so that the sum of their energies is equal to that of the pump photon. In terms of optical frequencies and wavelengths, this is expressed as:

$$\omega_p = \omega_s + \omega_i, \quad (1a)$$

$$1/\lambda_p = 1/\lambda_s + 1/\lambda_i, \quad (1b)$$

where $\omega_p$, $\omega_s$, and $\omega_i$ are the pump, signal and idler frequencies, which are related to the corresponding wavelengths $\lambda_m$ as $\omega_m = 2\pi/\lambda_m$. (here m stands for p, s, or i).

An important further constraint is that the sum of the signal and idler wave-vectors (k-vectors) must equal to that of the pump-momentum conservation or 'phase-matching' condition [A. Yariv: Quantum Electronics, 3rd ed. (Wiley, New York 1988)].

$$k_p = k_s + k_i, \quad (2)$$

where $k_p$, $k_s$, and $k_i$ are the pump, signal and idler k-vectors, which are related to the corresponding wavelengths $\lambda_m$ as $k_m = 2\pi n_m/\lambda_m$, where $n_m$ is the refractive index for each wave (m stands for p, s, or i).

The latter condition is never satisfied in the transparency range of isotropic media, where normal dispersion applies, but can be fulfilled in birefringent crystals through angle tuning. Alternatively, it can be fulfilled in "quasi-phase-matched" (QPM) crystals with periodically modulated nonlinearity (typical example is periodically-poled lithium niobate), where the artificially created grating of optical nonlinearity compensates for the wave-vector mismatch [M. M. Fejer, G. A. Magel, D. H. Jundt, R. L. Byer: Quasi-phase-matched $2^{nd}$ harmonic-generation, Tuning and tolerances, IEEE J. Quantum Electron. 28, 2631-2654 (1992)].

Rotating the crystal (in the case of birefringent phase matching) or changing the quasi-phase-matched (QPM) orientation-reversal period (in the case of QPM crystals) changes the ratio between the signal and idler photon energies through phase-matching condition. This tunes the frequency of the output [I. T. Sorokina and K. L. Vodopyanov (Eds.), Solid-State Mid-Infrared Laser Sources (Springer, Berlin, 2003)]. Alternatively, the same goal can be achieved (in both birefringent and QPM crystals) by changing the crystal's temperature.

Wide OPO acceptance bandwidths can be achieved near OPO degeneracy point (that is when the signal and the idler beams have the same optical frequency) at the condition of type-I or type-0 phase matching (when the signal and the idler beams have the same polarization) [A. J. Campillo et al., U.S. Pat. No. 4,349,907 (September 1982); R. C. Slater, U.S. Pat. No. 7,023,545 B2 (April 2006)]. This means that an optical parametric oscillator (OPO), an optical parametric generator (OPG, a traveling-wave parametric device), or an optical parametric amplifier (OPA), can generate (or amplify) a broad range of frequencies simultaneously.

Moreover, one can maximize the gain bandwidth of the optical parametric device at degeneracy by carefully choosing the pump wavelength, crystalline orientation and/or QPM period. Specifically, the largest gain bandwidth for parametric process can be achieved near a certain wavelength $\lambda_0$, such that the group-velocity dispersion of a NLO crystal near this wavelength is close to zero:

$$d^2k/d\omega^2 \approx 0, \quad (3)$$

and if the wavelength of the pump laser source is chosen to be equal to half of that wavelength, $\lambda_p = \lambda_0/2$. [A. Birmontas, A. Piskarskas, and A. Stabinis, Sov. J. Quantum Electron. 13, 1243 (1983)].

In this case, an anomalously broad, approximately octave-wide gain bandwidth around the degenerate signal-idler wavelength $\lambda_0$, can be obtained for both angle-phase-matched crystals, e.g. ZnGeP$_2$ (ZGP) [K. L. Vodopyanov, V. G. Voevodin, Opt. Commun. 117, 277 (1995)] and quasi-phase-matched crystals, e.g. GaAs [P. S. Kuo, K. L. Vodopyanov, M. M. Fejer, D. M. Simanovskii, X. Yu, J. S. Harris, D. Bliss, D. Weyburne, Opt. Lett. 31, 71 (2006)].

The condition (3) for the broadband OPA operation is formally equivalent to the condition:

$$d^2\lambda_p/d\lambda_s^2 \approx 0, \quad (4)$$

described in [G. Imeshev et al., U.S. Patent Application US2005/0238070 A1 (October 2005)].

In the prior art work, a narrow-linewidth OPG tunable over the 14.8 to 18.5 μm region was described by Campillo et al. [A. J. Campillo et al., U.S. Pat. No. 4,349,907 (September 1982)]. The drawbacks of the setup are that it is very complex: it consists of 3 different NLO crystals and uses a 2-stage frequency conversion process to achieve mid-IR output, hence it needs an energetic laser pumping source (energy 10 mJ and few ps pulsewidth), in addition, it has very low conversion efficiency, on the order of $10^{-4}$, which limits it practical application. Also, the invention does not mention the idea of working close to the zero group-velocity dispersion (3).

A broadband source based on parametric device was described by Slater [R. C. Slater, U.S. Pat. No. 7,023,545 B2 (April 2006)], which can be used for chemical identification by flash spectroscopy. The invention uses the idea of a wide OPO acceptance bandwidth near degeneracy, but does not mention the condition (3) for achieving the highest bandwidth. Accordingly, the projected broadband output has a bandwidth of only ~200 cm$^{-1}$, which is much less than an octave.

There is a need for a system that allows broadband tuning of the output radiation with an option for fast tuning.

SUMMARY OF THE INVENTION

An object of the present invention is a coherent infrared OPO light source for producing narrow-linewidth output that is continuously and fast tunable within an ultrabroad (at least one-octave-wide) range of optical wavelengths. Different wavelength ranges can be selected by the appropriate choice of a pump laser source, nonlinear crystal, its orientation and/or QPM period.

Optical parametric oscillators in accordance with the invention use continuous-wave (CW) or pulsed laser sources and advantageously include the following NLO crystals: (1) lithium niobate (pump near $\lambda=0.93$ μm, tuning over the range of 1.3-3 μm), (2) ZnGeP$_2$ (ZGP) (pump at 2.6 μm, 3.8-8 microns), (3) gallium arsenide (GaAs) (pump at 3 μm, 4-12 microns), (4) CdGeAs$_2$ (CGA) (pump at 4.1 μm, 6-13 microns) and other crystals.

Fast OPO wavelength tuning may be achieved by rotating an intracavity diffraction grating in a Littrow configuration.

Accordingly, it is an object of the invention to provide improved optical parametric oscillators.

Another object of the invention is to provide improved wavelength tunable laser systems.

Another object of the invention is to provide a fast OPO tuning mechanism, which allows switching between any two wavelengths of the broadband range within 1 ms or less.

Another object of the invention is to provide an improved method of making an optical parametric oscillator with >50% conversion efficiency.

DETAILED DESCRIPTION OF THE INVENTION

Figure 1:
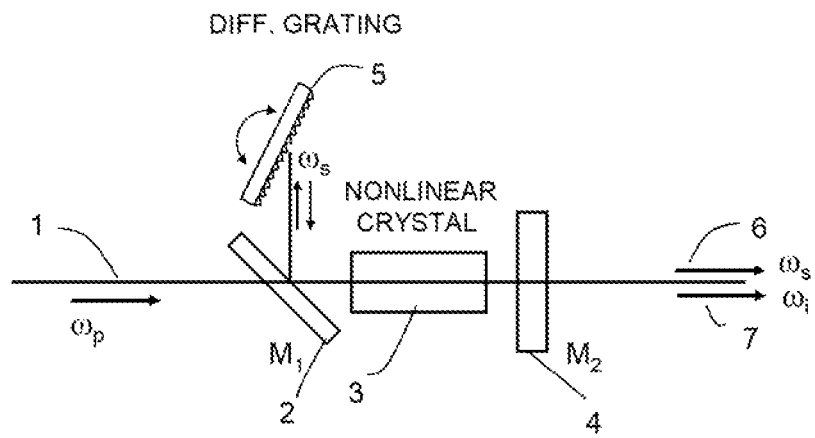
FIG. 1 Schematic views of the optical system for practicing the invention. The pump beam is single-passed through the nonlinear crystal.

FIG. 1 illustrates a first embodiment of a system for practicing the invention. A pump laser beam of photons 1 with the wavelength $\lambda_p$ is directed toward a resonant cavity. The resonant cavity includes a first mirror 2, a nonlinear optical element 3, a second mirror 4, and a spectral selector 5. In the preferred embodiment the spectral selector is a diffraction grating in a Littrow (back-reflecting) configuration. The mirrors are designed to have high reflectivity for the signal wave (at the optical wavelength $\lambda_s$) and have high transmission for the pump ($\lambda_p$) and the idler wave ($\lambda_i$). The OPO resonates at the wavelength of the signal wave and the diffraction grating is used to select a desired resonating wavelength $\lambda_s$. The signal and the idler outputs 6, 7 are extracted through the mirror 4.

Figure 2:
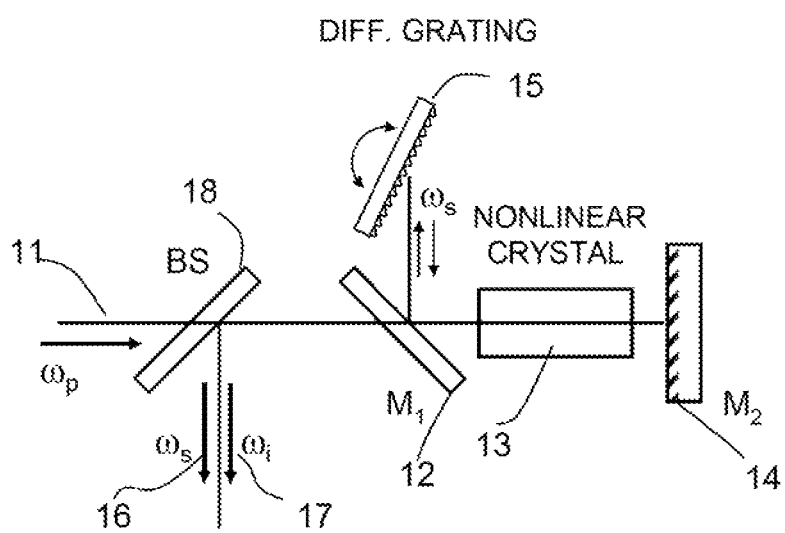
FIG. 2 Schematic views of the optical system for practicing the invention. The pump beam is double-passed through the nonlinear crystal.

FIG. 2 illustrates a second embodiment of a system for practicing the invention. A pump laser beam of photons 11 with the wavelength $\lambda_p$ is directed through a beamsplitter 18 toward the resonant cavity. The beamsplitter 18 is transparent for the pump and is highly reflective for the signal and idler waves. The resonant cavity includes a first mirror 12, a nonlinear optical crystal 13, a second mirror 14, and a spectral selector 15. In the preferred embodiment the spectral selector is a diffraction grating 15 in a Littrow configuration. As in the previous embodiment, the mirror 12 is designed to have high reflectivity for the signal wave and high transmission for the pump and the idler wave. However the mirror 14 is metallic, so that all three waves are reflected back. Thus, the signal wave resonates, while the pump and the idler waves are recycled to have a second pass before leaving the OPO cavity. The diffraction grating is used to select a desired resonating signal wave wavelength $\lambda_s$. The signal and the idler outputs 16, 17 are extracted through the mirror 12 and separated from the pump by the beamsplitter 18.

Figure 3:
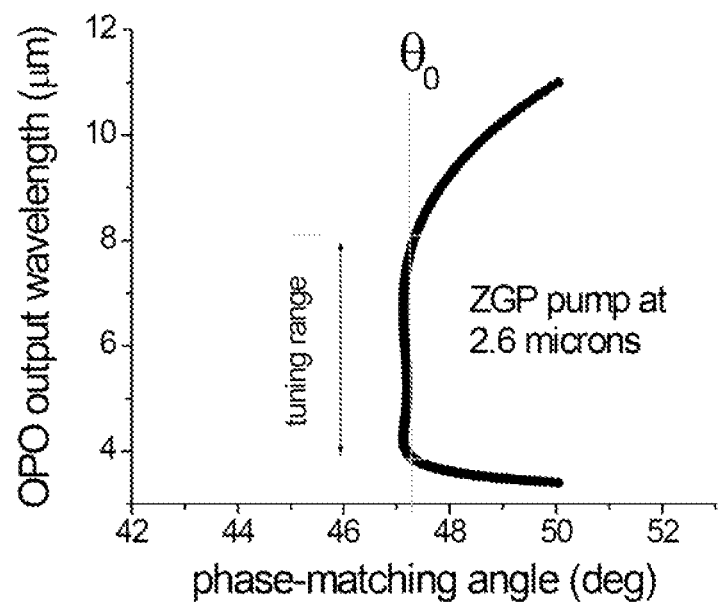
FIG. 3 Angular tuning curve for the ZnGeP$_2$ (ZGP) crystal illustrating extremely broad optical parametric gain bandwidth near degeneracy (5.2 μm), at the pump wavelength of 2.6 μm.
Figure 4:
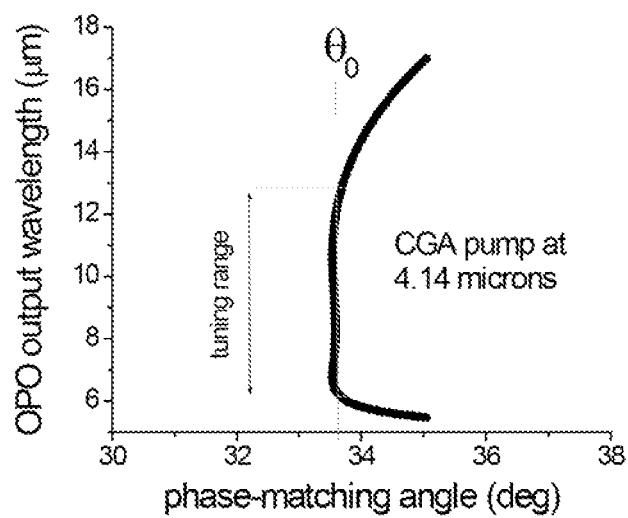
FIG. 4 Angular tuning curve for the CdGeAs$_2$ (CGA) crystal illustrating extremely broad optical parametric gain bandwidth near degeneracy (8.2 μm), at the pump wavelength of 4.1 μm.
Figure 5:
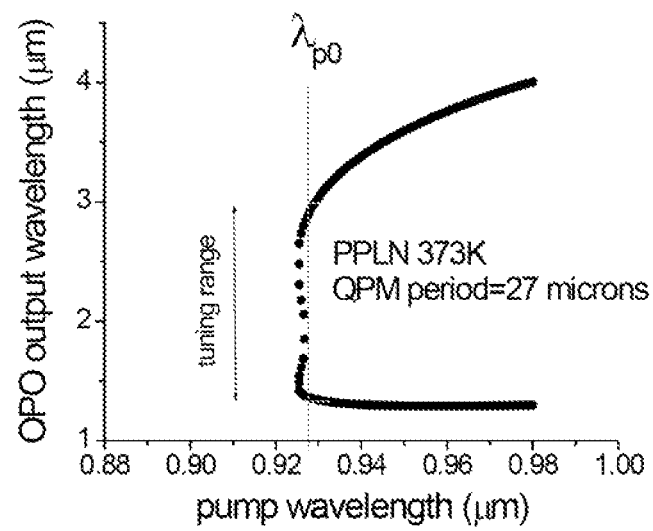
FIG. 5 Pump tuning curve for the periodically-poled lithium niobate (PPLN) crystal with an extremely broad optical parametric gain bandwidth near degeneracy (1.86 μm), at the pump wavelength of 0.93 μm and QPM period of the crystal of 27 μm.
Figure 6:
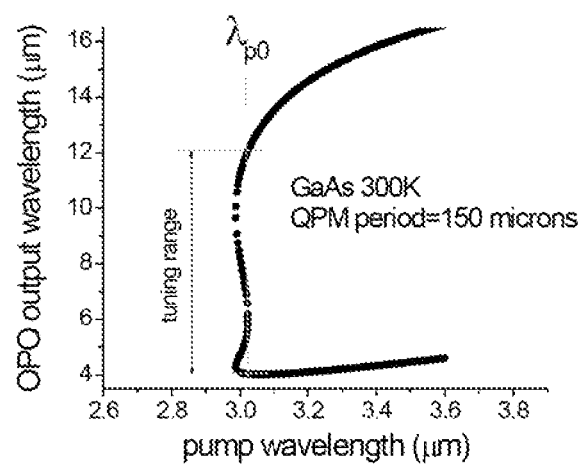
FIG. 6 Pump tuning curve for the periodically-inverted QPM gallium arsenide (GaAs) crystal with an extremely broad optical parametric gain bandwidth near degeneracy (6 μm), at the pump wavelength of 3 μm and QPM period of the crystal of 150 μm.

When the condition (3) of the broadband operation is met, conditions (1) and (2) are fulfilled simultaneously within a very wide spectral range near degeneracy. FIG. 3 shows angular tuning curve for the ZnGeP$_2$ (ZGP) crystal illustrating extremely broad optical parametric gain bandwidth near degeneracy (5.2 μm), at the pump wavelength of 2.6 μm. FIG. 4 shows angular tuning curve for the CdGeAs$_2$ (CGA) crystal with a broad optical parametric gain bandwidth near degeneracy (8.2 μm), at the pump wavelength of 4.1 μm. FIG. 5 shows pump tuning curve for the QPM periodically-poled lithium niobate (PPLN) crystal with a broad optical parametric gain bandwidth near degeneracy (1.86 μm), at the pump wavelength of 0.93 μm and QPM period of the crystal of 27 μm. FIG. 6 Shows pump tuning curve for the periodically-inverted QPM gallium arsenide (GaAs) crystal with an extremely broad optical parametric gain bandwidth near degeneracy (6 μm), at the pump wavelength of 3 μm and QPM period of 150 μm.

By rotating the Littrow diffraction grating 5 (FIG. 1) or 15 (FIG. 2), any resonant signal wavelength ($\lambda_s$), and a complementary idler wave ($\lambda_i$), through condition (1), can be selected within the extensive OPO bandwidth, which is typically more than an octave-wide in terms optical frequency. For example, in the case of GaAs OPO (pump at $\lambda=3$ μm), the whole range of 4-12 μm can be accessed. Switching time of less than 1 ms between any two chosen wavelengths within this spectral range can be achieved by rotating the diffraction grating using fast electronically-controlled galvano or piezoelectric scanners with scanning frequencies in the kilohertz range.

To access shorter and longer wavelength ranges, a big variety of other NLO crystals can be used in the described OPO, e.g. CdSiP$_2$, QPM gallium phosphide (GaP), QPM zinc selenide (ZnSe), QPM gallium nitride (GaN) and others.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

I claim:

1. A laser system for producing a narrow-bandwidth, coherent, infrared radiation, wavelength tunable output beam, comprising:
   a pump wavelength source providing a selected pump wavelength output;
   an optical parametric oscillator (OPO) including a nonlinear optical component, disposed to receive the selected pump wavelength output; and
   an output controllable, spectrally selective element disposed within the OPO,
   further characterized by a tuning rate that is equal to or greater than 1 kHz for any two wavelengths over a gain bandwidth.

2. The laser system of claim 1, wherein the OPO is characterized by an optical gain provided by a three-wave parametric process.

3. The laser system of claim 1, further characterized by a continuous tunability over al least a portion of the gain bandwidth.

4. The laser system claim 1, further characterized by a resonant wave created by the OPO that includes at least one of a signal wave and an idler wave.

5. The laser system of claim 1, wherein the OPO is a type-I or a type-0 near-degenerate optical parametric oscillator.

6. The laser system of claim 1, wherein $k_p = k_s + k_i$, where $k_p$, $k_s$, and $k_i$ are the pump, signal, and idler k-vectors, and $d^2k/d\omega^2 \approx 0$ or $d^2\lambda_p/d^2\lambda_s \approx 0$ at degeneracy, where $\omega$ is the angular optical frequency, $\lambda_p$ is the pump wavelength, and $\lambda_s$ is the signal wavelength, such that the OPO is characterized by a degeneracy wavelength, $\lambda_0$, that is approximately equal to a wavelength where the nonlinear optical component has zero or approximately zero group velocity dispersion.

7. The laser system of claim 1, wherein the output controllable, spectrally selective element is a rotatable diffraction grating in a Littrow configuration.

8. The laser system of claim 7, further comprising a fast galvano or piezoelectric scanner coupled to the diffraction grating.

9. The laser system of claim 1, wherein the nonlinear optical component comprises a ZGP crystal pumped at 2.6 microns and tunable over the range of 3.8-8 microns.

10. The laser system of claim 1, wherein the nonlinear optical component comprises a CGA crystal pumped at 4.1 microns and tunable over the range of 6-13 microns.

11. The laser system of claim 1, wherein the nonlinear optical component comprises a PPLN crystal pumped at 0.93 microns and tunable over the range of 1.3-3 microns.

12. The laser system of claim 1, wherein the nonlinear optical component comprises a GaAs crystal pumped at 3 microns and tunable over the range of 4-12 microns.

13. The laser system of claim 1, wherein the nonlinear optical component is broadly tunable $CdSiP_2$, QPM gallium phosphide (GaP), QPM zinc selenide (ZnSe), or QPM gallium nitride (GaN).

14. The laser system of claim 1, wherein the OPO includes a non-IR transparent resonator mirror.

15. The laser system of claim 1, wherein the pump wavelength source is tunable.

16. A method for increasing the gain bandwidth of an OPO-based laser system, comprising:
   providing a pump wavelength source providing a selected pump wavelength output;
   an optical parametric oscillator (OPO) including a nonlinear optical component, disposed to receive the selected pump wavelength output; and
   an output controllable, spectrally selective element disposed within the OPO;
   providing the selected wavelength pump output to the OPO, the OPO creating a resonant wave;
   propagating the resonant wave towards the spectrally selective element, such that the OPO is characterized by a degeneracy wavelength, $\lambda_0$, that is approximately equal to a wavelength where the nonlinear optical component has zero group velocity dispersion;
   outputting a narrow-bandwidth, coherent infrared radiation beam over a broadband spectral tuning range; and
   tuning the output beam wavelength between any two wavelengths over the gain bandwidth at a rate that is equal to or greater than 1 kHz.

17. The method of claim 16, comprising providing one of a fixed and a tunable pump wavelength source.

18. A laser system for producing a narrow-bandwidth, coherent, infrared radiation, wavelength tunable output beam, comprising:
   a pump wavelength source providing a selected pump wavelength output;
   an optical parametric oscillator (OPO) including a nonlinear optical component, disposed to receive the selected pump wavelength output; and
   an output controllable, spectrally selective element disposed within the OPO,
   wherein the laser system is characterized by a gain bandwidth,
   further wherein kp=ks+ki, where kp, ks, and ki are the pump, signal, and idler k-vectors, and d2k/dω2≈0 or d2λp/d2λs≈0 at degeneracy, where ω is the angular optical frequency, λp is the pump wavelength, and λs is the signal wavelength, such that the OPO is characterized by a degeneracy wavelength, λ0, that is approximately equal to a wavelength where the nonlinear optical component has zero or approximately zero group velocity dispersion.

19. The laser system of claim 18, wherein the OPO is characterized by an optical gain provided by a three-wave parametric process.

20. The laser system of claim 18, further characterized by a tuning rate that is equal to or greater than 1 kHz for any two wavelengths over the gain bandwidth.

21. The laser system of claim 18, further characterized by a continuous tunability over at least a portion of the gain bandwidth.

22. The laser system claim 18, further characterized by a resonant wave created by the OPO that includes at least one of a signal wave and an idler wave.

23. The laser system of claim 18, wherein the OPO is a type-I or a type-0 near-degenerate optical parametric oscillator.

24. The laser system of claim 18, wherein the output controllable, spectrally selective element is a rotatable diffraction grating in a Littrow configuration.

25. The laser system of claim 24, further comprising a fast galvano or piezoelectric scanner coupled to the diffraction grating.

26. The laser system of claim 18, wherein the nonlinear optical component comprises a ZGP crystal pumped at 2.6 microns and tunable over the range of 3.8-8 microns.

27. The laser system of claim 18, wherein the nonlinear optical component comprises a CGA crystal pumped at 4.1 microns and tunable over the range of 6-13 microns.

28. The laser system of claim 18, wherein the nonlinear optical component comprises a PPLN crystal pumped at 0.93 microns and tunable over the range of 1.3-3 microns.

29. The laser system of claim 18, wherein the nonlinear optical component comprises a GaAs crystal pumped at 3 microns and tunable over the range of 4-12 microns.

30. The laser system of claim 18, wherein the nonlinear optical component is broadly tunable CdSiP2, QPM gallium phosphide (GaP), QPM zinc selenide (ZnSe), or QPM gallium nitride (GaN).

31. The laser system of claim 18, wherein the OPO includes a non-IR transparent resonator mirror.

32. The laser system of claim 18, wherein the pump wavelength source is tunable.

* * * * *